(12) United States Patent
Simon et al.

(10) Patent No.: US 9,703,108 B2
(45) Date of Patent: Jul. 11, 2017

(54) EYE-GLASSES FOR VIEWING STEREOSCOPIC IMAGES OR A PERSPECTIVE SUB-IMAGE OF SAME

(71) Applicant: INFITEC GMBH, Ulm (DE)

(72) Inventors: Arnold Simon, Neu-Ulm (DE); Helmut Jorke, Gerstetten (DE)

(73) Assignee: Infitec GmbH, Ulm (DE)

( * ) Notice: Subject to any disclaimer, the term of this patent is extended or adjusted under 35 U.S.C. 154(b) by 100 days.

(21) Appl. No.: 14/017,945

(22) Filed: Sep. 4, 2013

(65) Prior Publication Data

US 2014/0009827 A1 Jan. 9, 2014

Related U.S. Application Data

(63) Continuation of application No. PCT/EP2012/053639, filed on Mar. 2, 2012.

(30) Foreign Application Priority Data

Mar. 4, 2011 (DE) .................. 10 2011 005 136

(51) Int. Cl.
*G02B 27/22* (2006.01)
*H04N 13/04* (2006.01)
*G02B 5/28* (2006.01)

(52) U.S. Cl.
CPC .......... *G02B 27/2228* (2013.01); *G02B 5/28* (2013.01); *G02B 27/2207* (2013.01); *H04N 13/0431* (2013.01)

(58) Field of Classification Search
CPC .. G02B 27/2228; G02B 27/2207; G02B 5/28; G02B 27/22; G02B 27/2214; G02B 27/2221; H04N 13/0431

USPC .................................. 359/464, 580
See application file for complete search history.

(56) References Cited

U.S. PATENT DOCUMENTS

2007/0247709 A1  10/2007 Karakawa
2010/0060857 A1*  3/2010 Richards et al. ............. 353/7
2010/0066813 A1  3/2010 Jorke
(Continued)

FOREIGN PATENT DOCUMENTS

DE  10 2006 054 713 A1  6/2008
DE  WO 2010091807 A1 *  8/2010 ............. C08G 18/48
EP  2 218 742 A1  8/2010
(Continued)

*Primary Examiner* — Thomas K Pham
*Assistant Examiner* — Marin Pichler
(74) *Attorney, Agent, or Firm* — Muncy, Geissler, Olds & Lowe, P.C.

(57) ABSTRACT

Eye-glasses for viewing stereoscopic images or a perspective sub-image of a stereoscopic image, comprising at least one interference filter that has at least one photosensitive polymer film and at least two separated filter regions, said filter regions being superimposed along at least one normal line that stands vertically on a first outer surface of the interference filter, between a first point at which the normal line pierces the first outer surface and a second point at which the normal line pierces a second outer surface of the interference filter after having passed through said interference filter proceeding from the first point, and said filter regions being, along said normal line, at least substantially impermeable to a respective predetermined wavelength interval of the electromagnetic spectrum.

12 Claims, 4 Drawing Sheets

(56) References Cited

U.S. PATENT DOCUMENTS

2011/0102562 A1* 5/2011 Johnson, Jr. ....... H04N 13/0422
                                                    348/58
2011/0311906 A1   12/2011 Rölle et al.

FOREIGN PATENT DOCUMENTS

| WO | WO 2008/140787 A2 | 11/2008 |
| WO | WO 2012/000979 A1 | 1/2012 |

* cited by examiner

EYE-GLASSES FOR VIEWING STEREOSCOPIC IMAGES OR A PERSPECTIVE SUB-IMAGE OF SAME

This nonprovisional application is a continuation of International Application No. PCT/EP2012/053639, which was filed on Mar. 2, 2012, and which claims priority to German Patent Application No. DE 10 2011 005 136.8, which was filed in Germany on Mar. 4, 2011, and which are both herein incorporated by reference.

BACKGROUND OF THE INVENTION

Field of the Invention

The present invention relates to eyeglasses for viewing stereoscopic images, or a perspective sub-image of a stereoscopic image, having at least one interference filter.

Description of the Background Art

A stereoscopic projection system and a method for generating an optically perceptible three-dimensional image rendering are known from DE 10 2006 054 713 A1, which corresponds to US 2010/0066813, which is herein incorporated by reference. Here, for each of two perspective sub-images (left or right) of a stereo image, regions of the visible spectrum, which are defined differently by color filters, are implemented in such a way that a plurality of only limited spectral intervals are transmitted in the region of the color perception blue (B), green (G), and red (R). The position of the transmitting intervals is selected differently for the two perspective sub-images.

A similar system is known from WO 2008/140787 A2. For the purpose of viewing stereoscopic images, this system uses eyeglasses having curved eyeglass lenses on which complementary spectral filters are provided. Because of the curvature of the eyeglass lenses, and consequently also of the filters, wavelength shifts of the transmission properties of the filters, which are dependent on the direction of view of a person wearing the eyeglasses, are compensated.

In addition, EP 2 218 742 A1, which corresponds to US2011311906 discloses the application of photopolymers based on special urethane acrylates as writing monomers that are suitable for the production of holographic media, in particular for the visual display of images, in printing processes.

SUMMARY OF THE INVENTION

It is therefore an object of the present invention to provide eyeglasses for viewing stereoscopic images or a perspective sub-image of a stereoscopic image whose optical properties can be determined with high precision and that also can be manufactured economically.

According to an embodiment of the present invention, eyeglasses for viewing stereoscopic images or a perspective sub-image of a stereoscopic image are provided with at least one interference filter having at least one photosensitive polymer film, which filter has at least two separate filter regions, wherein the filter regions are arranged stacked along at least one normal line that is perpendicular to a first outside surface of the interference filter between a first point where the normal line pierces the first outside surface and a second point where the normal line pierces a second outside surface of the interference filter after passing through the interference filter starting from the first point, and which filter regions are at least nearly opaque, along the normal line, to a given predefined wavelength interval of the electromagnetic spectrum.

In contrast to interference filters that are produced by means of coating methods, the interference filter having a photosensitive polymer film of the eyeglasses according to the invention can be produced in a simple and economical manner by means of holographic exposure from two sides with coherent light. The filter regions or optical interference structures are formed in the polymer film by the exposure and are fixed by a subsequent bleaching process. The pitch of the interference structures, and thus the reflection spectrum and transmission spectrum of the filter regions, can be set by varying the angle of incidence during the exposure. In this way, filter regions, and in particular layer-like filter regions or filter layers, having a thickness of 10 to 15 nm and a residual transmission of less than 10%, less than 5%, less than 3%, less than 2%, and even less than 1% of the incident light, can be produced with high accuracy. In other words, said filter regions or filter layers are nearly opaque for the incident light. The optical exposure method that is employed exhibits high process stability, since the exposure generally is accomplished using lasers of fixed wavelengths. Although any variations in the film thickness or refractive index of the polymer film do influence the interior structure of the filter regions produced, the effects on the reflection properties of the regions are only negligible. Variations of a mechanical nature are minor and can be well controlled by extremely short exposure times. Moreover, because it is possible to dispense with coating processes, which typically are carried out in vacuum, as compared to prior art eyeglasses for viewing stereoscopic images the eyeglasses of the present invention are simpler, more economical, and, in particular, can be produced in a continuous process. Furthermore, interference filters of nearly all shapes, even ones with small radii, can be implemented with polymer materials. Eyeglasses for viewing stereoscopic images can be produced with any desired transmission properties through appropriate choice of the number and arrangement of the filter regions and of the predefined wavelength intervals. In this context, the number of filter regions encompassed by an interference filter or by a polymer film is arbitrary. Individual wavelength intervals or all the wavelength intervals of the filter regions may be disjoint from one another or they may overlap at least partially. In the case of eyeglasses with curved interference filters, the orientation of the normal line or normal is location-dependent and depends on the position of the first point on the first outside surface of the interference filter. However, it is sufficient for the eyeglasses according to the invention if at least one normal line is present that is perpendicular to at least one arbitrary outside surface of the interference filter and that pierces this outside surface and, after passing through the interference filter, also pierces another outside surface of the interference filter, the filter regions being arranged stacked between the pierce points. In particular, the first outside surface can be an outside surface facing the person wearing the eyeglasses equally well as an outside surface of the interference filter facing away from this person.

In the eyeglasses according to the invention, at least two of the filter regions or all of the filter regions can be arranged within a single photosensitive polymer film. The eyeglasses can also have at least two layered photosensitive polymer films, wherein at least two of the filter regions are arranged in different photosensitive polymer films or wherein each of the filter regions is arranged in one specific photosensitive polymer film. Layered polymer films can be produced by laminating individual polymer films. As a general rule, therefore, a filter region can be located completely in the interior of a polymer film or of the interference filter, or can be located at its edge. When a filter region is located at the edge of the interference filter, then a surface of the filter region forms at least a part of one of the outside surfaces of the interference filter. As a general rule, two filter regions can be separated from one another or they can be stacked on one another with no separation, wherein it is immaterial whether the two filter regions are formed in the same polymer film or in different polymer films, or whether they are provided in the interior of a polymer film or at its edge.

Preferably, in the eyeglasses according to the invention at least one of the filter regions extends through the entire interference filter and/or filter regions arranged adjacent to one another form a filter layer extending through the interference filter. A filter region that extends over the entire interference filter is especially simple to produce with the stated exposure method. However, a filter region need not necessarily extend over the entire polymer film; instead, it can be formed only within a limited area of the polymer film. For example, a filter region can be formed within a circular area of the polymer film. Filter layers with transmission properties that change in a nearly continuous manner can be implemented by means of additional filter regions arranged side by side with suitably chosen wavelength intervals for which the relevant filter regions are nearly opaque. Filter layers with filter properties that vary continuously in the lateral direction can also be produced by holographic exposure of polymer films by the means that angles of exposure of the coherent light are varied in a location-dependent manner. The laterally varying filter properties of a filter layer can be designed such that angle dependencies of transmission properties of the eyeglasses on the direction of view of a person wearing the eyeglasses are considerably reduced or even completely compensated.

For the eyeglasses in the present invention, it is especially preferred for the interference filter to have a curved shape in order to reduce shifts in transmission properties of at least one of the filter regions that depend on the direction of view of a person wearing the eyeglasses. The circumstance that the interference filter includes a polymer film proves to be especially advantageous here, since films are distinguished by especially great flexibility in shaping and can assume virtually all desired shapes. For example, exposed polymer films can be made into a curved shape by deep-drawing such that the angle dependency of the transmission properties of the filter region for different directions of view is reduced or even compensated. The use of bent or curved interference filters in combination with suitably designed filter regions for the purpose of reducing wavelength shifts of the transmission properties of the eyeglasses as a function of direction of view is especially advantageous.

In place of eyeglass lenses, the eyeglasses of the present invention can include only the at least one interference filter, or an interference filter each for the left and right eyes of a person wearing the eyeglasses. Such eyeglasses are distinguished by especially low weight, which can be minimized further by appropriate selection of the material for the eyeglass frames. As a general rule, the interference filter can be applied to a glass substrate or a plastic substrate or a thermoplastic substrate or a film substrate. In particular, an interference filter applied to or laminated onto a thermoplastic substrate can, after the application, be made into any desired shape together with the substrate.

Since the eyeglasses according to the invention are designed for viewing stereoscopic images, it is especially preferred for at least one of the wavelength intervals, or all wavelength intervals, to be located at least partially within the visible electromagnetic spectrum.

Moreover, the eyeglasses preferably include a first set of filter regions that are arranged stacked between points where a first normal line that is perpendicular to the first outside surface passes through the first and second outside surfaces, and a second set of filter regions that are arranged stacked between points where a second normal line that is perpendicular to the first outside surface passes through the first and second outside surfaces, wherein the wavelength ranges for which the filter regions of the first set are nearly opaque differ from the wavelength ranges for which the filter regions of the second set are nearly opaque. In this embodiment of the eyeglasses according to the invention, each of the two sets of filter regions can be provided for one eye of a person wearing the eyeglasses in order to produce the perspective images necessary for stereoscopic vision by means of suitable selection of the applicable wavelength intervals for which the filter regions are opaque. It is especially preferred here for a first filter region of the first set to be at least nearly opaque for wavelengths of 453 nm to 477 nm and/or for a second filter region of the first set to be at least nearly opaque for wavelengths of 537 nm to 563 nm and/or for a third filter region of the first set to be at least nearly opaque for wavelengths of 651 nm to 621 nm and/or for a first filter region of the second set to be at least nearly opaque for wavelengths of 441 nm to 463 nm and/or for a second filter region of the second set to be at least nearly opaque for wavelengths of 522 nm to 548 nm and/or for a third filter region of the second set to be at least nearly opaque for wavelengths of 604 nm to 633 nm.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
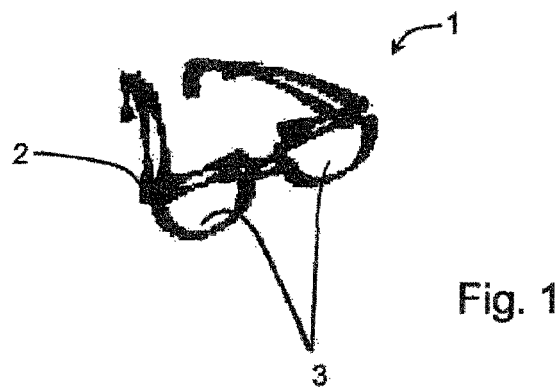
FIG. 1 shows a pair of eyeglasses for viewing stereoscopic images.

Shown in FIG. 1 is a pair of eyeglasses 1 according to an exemplary embodiment of the invention for viewing stereoscopic images. The eyeglasses 1 comprise a frame 2 and a left and a right film-like interference filter 3 in place of eyeglass lenses. As a result of the interference filters 3 in place of eyeglass lenses, the eyeglasses 1 have a low overall weight. The two interference filters 3 are similar in design and have optical properties or transmission properties for the wavelength spectrum of visible light such that different predefined regions of the visible spectrum are implemented with the eyeglasses 1 in a known manner for each of two perspective sub-images (left and right) of a stereoscopic image.

Figure 2:
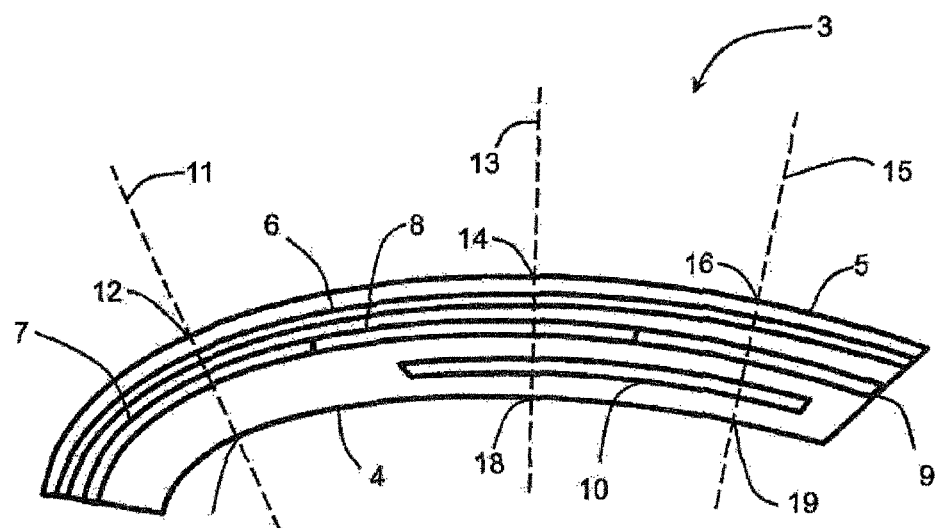
FIG. 2 shows a cross-section through an interference filter of the eyeglasses shown in FIG. 1.

A cross-section through one of the film-like interference filters 3 is visible in FIG. 2. The interference filter 3 has a curved shape that is provided to reduce wavelength shifts of the transmission properties of the interference filter 3 for different directions of view, in particular lateral directions of view, of a person wearing the eyeglasses 1, as is explained in detail below in connection with FIGS. 4 to 6. As is evident in FIG. 2, different layer-like filter regions 6, 7, 8, 9, and 10 are implemented between an outside surface 4 of the interference filter 3 that faces toward a person wearing the eyeglasses 1 and an outside surface 5 of the interference filter 3 that faces away from a person wearing the eyeglasses 1. The filter regions 6, 7, 8, 9, and 10 are separate, which is to say that they are unambiguously distinct from one another and in particular have no overlaps. In the present case, the filter region 6 is a filter region or filter layer extending through the entire interference filter 3 between the outside surfaces 4, 5 of the interference filter 3. Three filter regions 7, 8 and 9 located next to one another together form a continuous filter layer that extends essentially parallel to the filter layer 6, is separated therefrom, and, like the filter layer 6, extends through the entire interference filter 3. In contrast, the layer-like filter region 10 that is closest to the outside surface 4 is locally limited.

Each of the filter regions 6, 7, 8, 9, and 10 has a residual transmission of less than 5% for a given predefined wavelength interval of visible light, and thus is nearly opaque for wavelengths of this wavelength range. Such filter regions are also called notch filters.

The interference filter 3 can be produced by the means that the filter regions 6, 7, 8, 9, and 10 are created in photosensitive polymer films by holographic exposure of the polymer films by means of two coherent laser beams and subsequent fixing in a bleaching process, and the polymer films with the filter layers 6, 7, 8, 9, and 10 created therein are ultimately laminated onto one another. For example, the filter layer 6 can be created in a first photosensitive polymer film by exposure of the polymer film. After the exposure of the polymer film, the filter layer 6 that is created in it by the exposure is fixed. The filter layers 7, 8, and 9 can be created in a second photosensitive polymer film in a corresponding manner. In order to obtain the adjacent filter layers 7, 8, and 9 within a single polymer film, the angle of exposure on the polymer film is varied in a location-dependent manner during the exposure process. The filter layer 10 can be produced in a third polymer film in an analogous manner. If the second polymer film is now laminated onto the third polymer film and the first polymer film is laminated onto the second polymer film, this results in the interference filter 3 with the structure shown in FIG. 2, which need only be appropriately curved or bent in order to be used in the eyeglasses 1.

Since the interference filter 3 has a bent or curved shape, normal lines passing through individual points on the outside surfaces 4 or 5 that are perpendicular to the relevant outside surface will each be oriented differently. By way of example, FIG. 2 shows a normal line 11 that is normal to the outside surface 5 at a point 12, and a normal line 13 that is normal to the outside surface 5 at a different point 14, and a normal line 15 that is normal to the outside surface 5 at another point 16. In the present special case, in which the outside surfaces 4 and 5 are essentially parallel to one another, the normal lines 11, 13, and 15 are simultaneously perpendicular or normal to both outside surfaces 4 and 5; in general, this is not necessarily the case, since the outside surfaces 4 and 5 can be shaped differently in the fully general case, and in particular need not be parallel. Consequently, it is sufficient for the present object for only a single normal line, which is perpendicular to one of the outside surfaces 4 or 5, regardless of which one, to be present, with reference to which the features of claim 1 are met.

The normal line 11 passing through the point 12 on the outside surface 5 pierces the outside surface 4 at the point 17, while the normal line 13 passing through the point 14 on the outside surface 5 pierces the outside surface 4 at the point 18, and the normal line 15 passing through the point 16 on the outside surface 5 pierces the outside surface 4 at the point 19. The filter regions 6 and 7 are arranged stacked between the points 12 and 17, the filter regions 6, 8, and 10 are arranged stacked between the points 14 and 18, and the filter regions 6, 9, and 10 are arranged stacked between the points 16 and 19. This means that for a direction of view along the normal line 11, the optical effects of the filter regions 6 and 7 add, since each filter region 6 and 7 is at least nearly opaque along the normal line 11 for a given predefined wavelength interval of the electromagnetic spectrum, by which means the interference filter 3 is nearly opaque in this direction of view for both the wavelength interval to which the filter region 6 is opaque and the wavelength interval to which the filter region 7 is opaque. These two wavelength intervals are filtered out of the light passing through the interference filter 3 in the stated direction of view, which is to say they are blocked by the interference filter 3. The filter regions 6, 8, and 10 together have a similar effect for a direction of view along the normal line 13, and the filter regions 6, 9, and 10 together have a similar effect for a direction of view along the normal line 15, wherein in these two cases three wavelength intervals are in fact blocked by the interference filter 3. For directions of view that do not lie along a normal line, but instead are arbitrary, the action of the interference filter 3 is analogous: Depending on which of the filter regions 6, 7, 8, 9, and 10 are crossed at any desired angle of view, corresponding wavelength intervals are blocked by the interference filter 3. Thus, eyeglasses with nearly any desired transmission properties for any desired directions of view can be implemented by appropriate selection of the number, shape, size, and arrangement of filter regions and of the wavelength intervals they block. In particular, wavelength shifts of the transmission properties of the interference filter that depend on the direction of view can be at least reduced and even fully compensated in this way. To this end, filter regions can also be advantageously combined with appropriate shaping, in particular curvature, of the interference filter.

Figure 3:
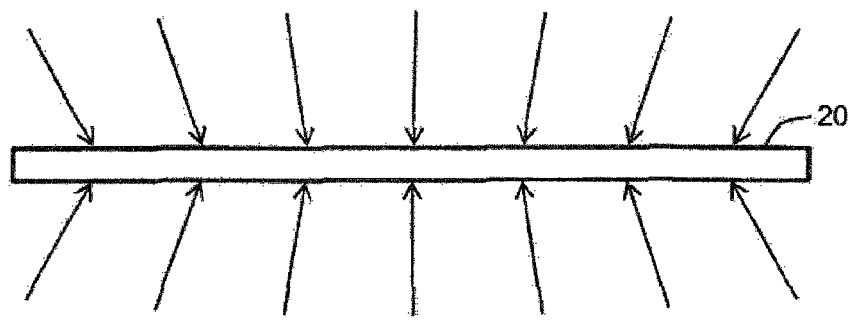
FIG. 3 shows a polymer film that is illuminated holographically.

Instead of arranging filter regions with different filter properties adjacent to one another as in the above example of the filter regions 7, 8, and 9 to obtain a filter layer with laterally changing transmission properties, it is also possible to produce a filter layer with transmission properties that change continuously in the lateral direction within a single photosensitive polymer film through holographic exposure of the polymer film, by the means that coherent laser light is radiated onto the polymer film from two sides with different angles of incidence. This is shown in FIG. 3 using the example of a polymer film 20 that is irradiated with coherent laser light from above and below in FIG. 3, wherein the angles of incidence of the laser light on the polymer film 20 vary in a location-dependent manner.

Figure 4:
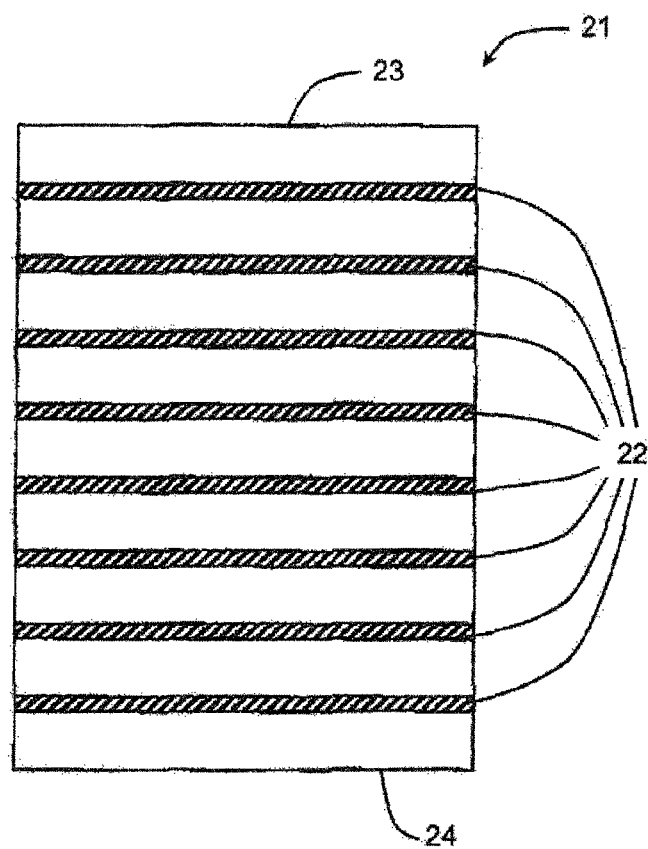
FIG. 4 shows a cross-section through an interference filter of another pair of eyeglasses.
Figure 5:
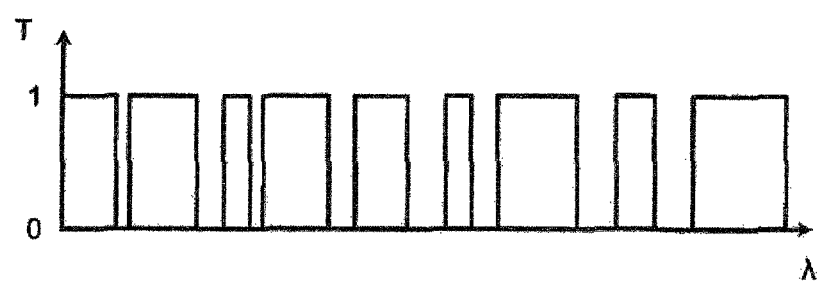
FIG. 5 shows a schematic representation of transmission properties of the eyeglasses with the interference filter shown in FIG. 4.

As another exemplary embodiment, FIG. 4 shows a cross-section through a non-curved interference filter 21 with a total of eight different filter regions 22 or filter layers that are mutually parallel, spaced apart from one another, and extend through the entire interference filter 21. Each of the eight filter regions 22 is nearly opaque to a specific wavelength interval, wherein all eight wavelength intervals are disjoint from one another. For the interference filter 21 as a whole, there thus results the transmission property shown schematically and by way of example in FIG. 5. FIG. 5 shows the transmission T of the interference filter 21 over the wavelength λ. As is evident from FIG. 5, the interference filter 21 has a transmission of 1 for all wavelengths with the exception of wavelengths in the stated eight wavelength intervals, where it has the transmission 0. Thus, all wavelengths in light passing through the interference filter 21 except for wavelengths in the eight wavelength intervals are allowed through unhindered, while wavelengths in the eight wavelength intervals are blocked.

The interference filter 21 in FIG. 4 has a non-curved, plane parallel shape with mutually parallel outside surfaces 23 and 24. Accordingly, all normal lines that are perpendicular to either of the two outside surfaces 23 and 24 and pierce them at any desired point are likewise parallel to one another, and each of the normal lines crosses each one of the eight filter regions 22 at right angles. Although lines or directions that are not parallel to the normal lines also cross each one of the eight filter regions 22, the distance that a light ray propagating in such directions requires in order to pass through one of the filter regions 22 becomes longer with increasing angle between the normal lines and a line or direction that is not parallel to the normal lines. This increased distance causes a wavelength shift in the transmission properties of the interference filter 21 that depends on the direction of view of a person wearing the eyeglasses with this interference filter 21. As long as the direction of view of the person is perpendicular to the outside surfaces 23, 24 of the interference filter 21, the transmission properties of the interference filter 21 are as shown in FIG. 5. The more the direction of view deviates from the perpendicular to the outside surfaces 23, 24, the more the transmission properties of the interference filter 21 shift. In practice, this has the effect that a person looking to the side through the eyeglasses perceives color shifts in the viewed image.

Figure 6:
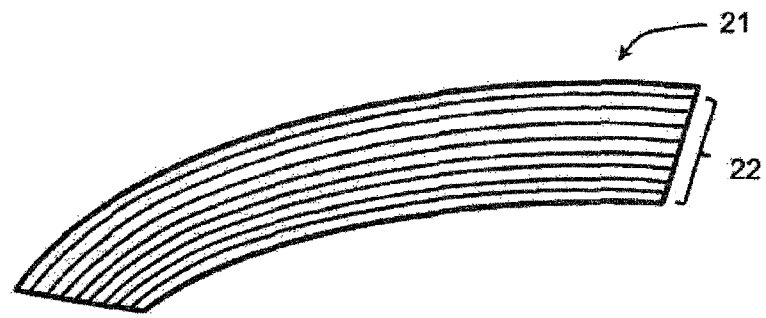
FIG. 6 shows the interference filter shown in FIG. 4 with a curvature.

As already mentioned, one option for preventing such color shifts in the interference filter 21 is to curve the interference filter 21 toward the sides with otherwise unchanged filter regions 22 as shown in FIG. 6, in order to minimize the distance traveled through the filter regions 22 by a light ray that is observed by a person wearing the eyeglasses with a lateral direction of view, so that it corresponds as closely as possible to the distance traveled through the filter regions 22 by a light ray traversing the interference filter 21 parallel to the normal line.

Another option for suppressing angle-of-view-dependent wavelength shifts in the interference filter 21 shown in FIG. 4 resides in an appropriate design of the filter regions 22 with an otherwise unchanged shape of the interference filter 21. For example, in a manner similar to the filter regions 7, 8, and 9 arranged in a row in Figure 2, the filter regions 22 can comprise multiple sub-regions, each of which has transmission properties selected such that they counteract the wavelength shift. Many such adjacent sub-regions with gradually changing transmission properties can, in total, even function like a filter layer that extends through the interference filter 21 and has transmission properties that vary continuously in the lateral, direction. Or else, the filter regions 22 are produced with transmission properties that vary in the lateral direction by means of exposure, as is shown in FIG. 3.

Thus, wavelength shifts that depend on the angle of view can be reduced or even compensated in a variety of ways: Either the filter regions are suitably selected including their transmission properties, which may be constant over the entire filter region or may vary laterally, or else the interference filter is suitably curved as shown in FIG. 6, or else the two options are combined with one another and curvature of the interference filter is provided in combination with appropriately arranged and designed filter regions. This last option is the case in the interference filter 3 in FIG. 2.

Figure 7:
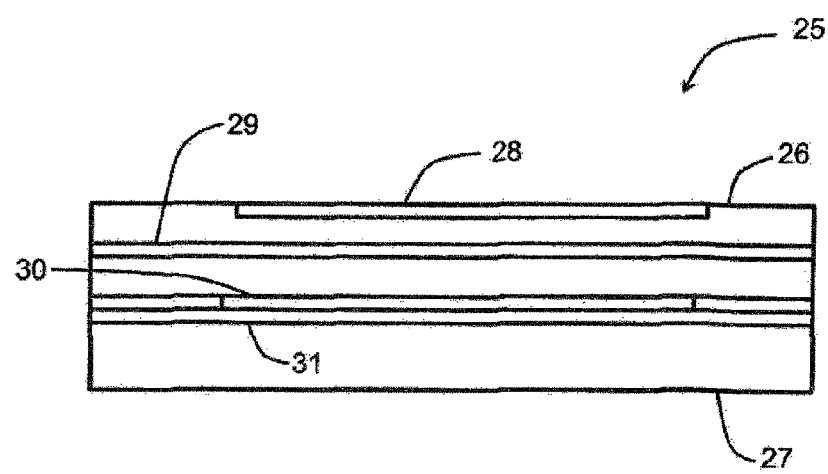
FIG. 7 shows another interference filter.

In all exemplary embodiments heretofore shown, all filter regions are located entirely in the interior of a single photosensitive polymer film. This need not necessarily be the case, however. In the completely general case, filter regions of an interference filter can be arranged arbitrarily within one or more polymer films. In particular, the filter regions need not necessarily be arranged stacked spaced apart from one another or fully within the interior of the polymer film, as is evident from FIG. 7, which shows an interference filter 25 comprising two photosensitive polymer films 26 and 27 that are laminated onto one another. The polymer film 26 has a filter region 28 provided in an edge region of the polymer film 26, wherein one surface of the filter region 28 forms a part of an outside surface of the interference filter 25. Another filter region 29 that is locally limited and spaced apart from the filter region 28 is located entirely within the polymer film 26. The second polymer film 27 likewise has a filter region 30 located in an edge region of the polymer film 27, although one surface of the filter region 30 forms a part of the particular outside surface of the polymer film 27 onto which the polymer film 26 is laminated. A filter region 31 that is located within the polymer film 27 and extends through the entire polymer film 27 is provided contiguous with the filter region 30.

Figure 8:
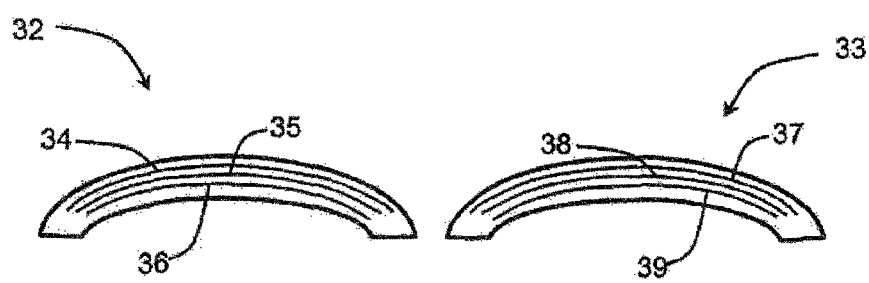
FIG. 8 illustrates two interference filters of eyeglasses according to the invention that are each associated with one eye of a person wearing the eyeglasses.

FIG. 8 represents cross-sections through two interference filters 32 and 33 of another pair of eyeglasses according to the invention. Here, the interference filter 32 is associated with the left eye of a person wearing the eyeglasses, while the interference filter 33 is associated with the right eye of this person. Each of the interference filters 32 and 33 has a specific set of three stacked filter regions in each case, wherein each of the filter regions has a thickness of approximately 10 nm. Both interference filters 32 and 33 are curved in design in order to compensate for angle-of-view-dependent wavelength shifts in the transmission properties of the filter regions. The interference filter 32 comprises a set of three filter regions 34, 35, and 36 that are arranged stacked between points where applicable normal lines that are perpendicular to outside surfaces of the interference filter 32 pierce the outside surfaces thereof, and the interference filter 33 comprises a set of three filter regions 37, 38, and 39 that are arranged stacked between points where applicable normal lines that are perpendicular to outside surfaces of the interference filter 33 pierce the outside surfaces thereof. Of the filter regions of the first set, the filter region 34 is opaque for wavelengths from 453 nm to 477 nm, the filter region 35 is opaque for wavelengths of 537 nm to 563 nm, the filter region 36 is opaque for wavelengths of 651 nm to 621 nm, and of the filter regions of the second set, the filter region 37 is opaque for wavelengths of 441 nm to 463 nm, the filter region 38 is opaque for wavelengths of 522 nm to 548 nm, and the filter region 39 is opaque for wavelengths of 604 nm to 633 nm. Despite certain overlaps, therefore, the wavelength ranges for which the filter regions 34, 35, and 36 of the first set are nearly opaque differ from the wavelength ranges for which the filter regions 37, 38, and 39 of the second set are nearly opaque. The eyeglasses with the interference filters 32 and 33 are thus capable of producing a separate perspective sub-image of a stereo image for each of the left and right eyes.

Figure 9:
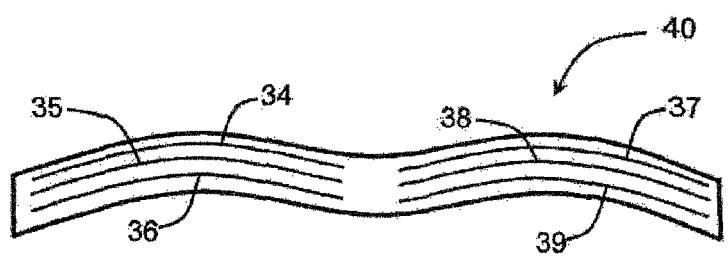
FIG. 9 shows an interference filter of eyeglasses according to the invention with sets of filter regions that are each associated with one eye of a person wearing the eyeglasses.

A cross-section through an interference filter 40 of another pair of eyeglasses according to the invention for viewing stereoscopic images, which has only this one interference filter 40, is shown in FIG. 9. The interference filter 40 comprises specific sets of three filter regions, each of which is associated with one eye of a person wearing the eyeglasses. In their filter properties, these sets of three filter regions correspond to the sets of filter regions of the interference filters 32 and 33 in FIG. 8, and consequently are labeled with the same reference characters. Accordingly, therefore, the interference filter 40 in FIG. 9 has three filter regions 34, 35, and 36 of a first set of filter regions that are associated with the left eye of a person wearing the eyeglasses with the interference filter 40, wherein the filter region 34 is opaque for wavelengths from 453 nm to 477 nm, the filter region 35 is opaque for wavelengths of 537 nm to 563 nm, and the filter region 36 is opaque for wavelengths of 651 nm to 621 nm, and has three filter regions 37, 38, and 39 of a second set of filter regions that are associated with the right eye of a person wearing the eyeglasses with the interference filter 40, wherein the filter region 37 is opaque for wavelengths of 441 nm to 463 nm, the filter region 38 is opaque for wavelengths of 522 nm to 548 nm, and the filter region 39 is opaque for wavelengths of 604 nm to 633 nm. The interference filter 40 is appropriately curved in design in order to compensate for angle-of-view-dependent wavelength shifts in the transmission properties of the filter regions.

Instead of providing individual sets of filter regions with different transmission properties for the left and right eyes as in the eyeglasses in FIGS. 8 and 9, the sets of filter regions associated with the left and right eyes can also be identical, so that the transmission properties of such eyeglasses are the same for the left eye as for the right eye. Using such eyeglasses, it is possible to view only one of the two perspective sub-images of a stereoscopic image, for example.

Usually, however, the sets of filter regions are provided such that they produce different predefined regions of the visible spectrum for each of two perspective sub-images of a stereoscopic image such that multiple, only limited spectral intervals are transmitted, wherein the location of the transmitting intervals is chosen to be different for the two perspective sub-images. This is shown in FIG. 10.

Figure 10:
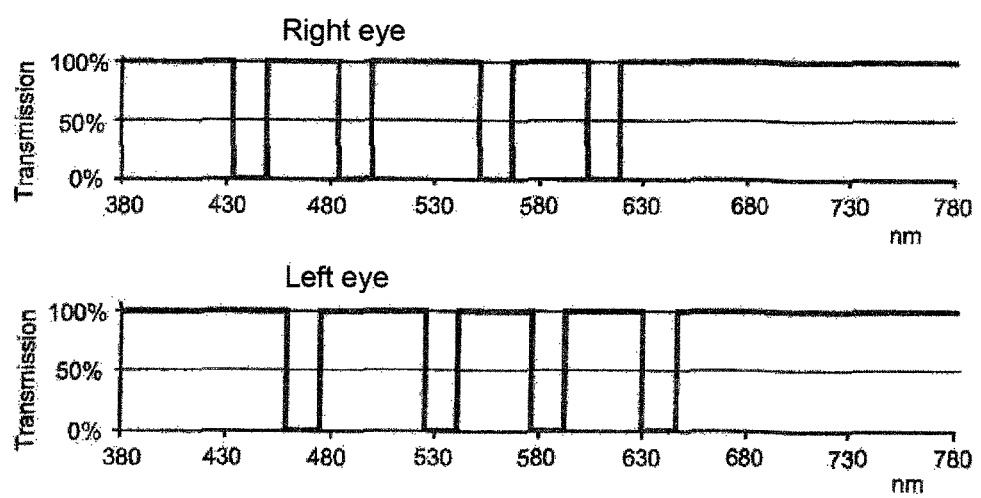
FIG. 10 illustrates transmission properties of another pair of eyeglasses according to the invention.

FIG. 10 shows the transmission properties of a pair of eyeglasses for viewing stereoscopic images, in which—in a manner similar to the cases in FIGS. 8 and 9—individual sets of filter regions with different transmission properties are provided for the left and right eyes of a person wearing the glasses, wherein, however, each set now comprises a stacked arrangement of four filter regions instead of three. The top part of FIG. 10 shows the transmission spectrum of the eyeglasses for the right eye, while the transmission spectrum of the eyeglasses for the left eye can be seen in the bottom part of FIG. 10. In each case, the transmission is plotted in percent as a function of wavelength in nm. As is evident, the eyeglasses cut four wavelength intervals out of the visible spectrum for the right eye. Four wavelength intervals are likewise cut out of the visible spectrum for the left eye. However, the four wavelength intervals that are cut out of the visible spectrum for the left eye are always located between the wavelength intervals that are cut out of the visible spectrum for the right eye, without the wavelength intervals that are cut out of the visible spectrum for the left eye overlapping the wavelength intervals that are cut out of the visible spectrum for the right eye. The wavelength intervals that are cut out of the visible spectrum for the right eye are thus arranged in alternation with the wavelength intervals that are cut out of the visible spectrum for the left eye.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. Eyeglasses for viewing stereoscopic images or a perspective sub-image of a stereoscopic image, the eyeglasses comprising:
   an interference filter for a right eye and an interference filter for a left eye,
   each interference filter formed of at least one photosensitive polymer film, and including separate filter regions,
   wherein, in each interference filter, at least two of the separate filter regions are arranged stacked along at least one normal line that is substantially perpendicular to a first outside surface between a first point, where the at least one normal line pierces the first outside surface, and a second point, where the at least one normal line pierces a second outside surface,
   wherein the separate filter regions have a residual transmission of less than 10%, such that the separate filter regions are nearly opaque, along the at least one normal line for a given predefined wavelength interval of the electromagnetic spectrum, and
   wherein the at least two of the separate filter regions stacked along the at least one normal line are arranged within a single photosensitive polymer film of the at least one photosensitive polymer film,
   wherein, in each interference filter, at least two of the separate filter regions are arranged stacked along a second normal line that is laterally offset from the at least one normal line,
   wherein at least one of the at least two of the separate filter regions stacked along the second normal line is different from at least one of the at least two of the separate filter regions stacked along the at least one normal line.

2. The eyeglasses according to claim 1, further comprising at least two layered photosensitive polymer films, wherein at least two of the separate filter regions are arranged in different photosensitive polymer films.

3. The eyeglasses according to claim 1, wherein at least one of the filter regions extends through each entire interference filter, respectively, or wherein the filter regions arranged adjacent to one another form a filter layer extending through each interference filter, respectively.

4. The eyeglasses according to claim 1, wherein each interference filter has a curved shape that reduces shifts in transmission properties of at least one of the filter regions that depend on a direction of view of a person wearing the eyeglasses.

5. The eyeglasses according to claim 1, wherein each interference filter is applied to a glass substrate or a plastic substrate or a thermoplastic substrate or a film substrate.

6. The eyeglasses according to claim 1, wherein at least one of the wavelength intervals, or all wavelength intervals, is/are located at least partially within the visible electromagnetic spectrum.

7. The eyeglasses according to claim 1, wherein a first set of the separate filter regions are arranged stacked between points where a first normal line of the at least one normal line that is perpendicular to the first outside surface passes through the first and second outside surfaces, and a second set of the separate filter regions are arranged stacked between points where a second normal line of the at least one normal line that is perpendicular to the first outside surface passes through the first and second outside surfaces, and wherein the wavelength ranges for which the filter regions of the first set are nearly opaque differ from the wavelength ranges for which the filter regions of the second set are nearly opaque.

8. The eyeglasses according to claim 7, wherein a first filter region of the first set is at least nearly opaque for wavelengths of 453 nm to 477 nm and/or a second filter region of the first set is at least nearly opaque for wavelengths of 537 nm to 563 nm and/or a third filter region of the first set is at least nearly opaque for wavelengths of 651 nm to 621 nm and/or a first filter region of the second set is at least nearly opaque for wavelengths of 441 nm to 463 nm and/or a second filter region of the second set is at least nearly opaque for wavelengths of 522 nm to 548 nm and/or a third filter region of the second set is at least nearly opaque for wavelengths of 604 nm to 633 nm.

9. The eyeglasses according to claim 1, wherein the separate filter regions are notch filters.

10. The eyeglasses according to claim 1, wherein the at least one photosensitive polymer film is sensitive to holographic illumination, such that exposure to holographic illumination forms the separate filter regions.

11. The eyeglasses according to claim 1, wherein the separate filter regions have a residual transmission of less than 5%.

12. The eyeglasses according to claim 1, wherein the separate filter regions are nearly opaque in different predefined wavelength ranges.

* * * * *